Sept. 6, 1960  D. L. SHINN  2,951,416
DEVICE FOR MEASURING FILM THICKNESS
Filed Oct. 16, 1956

INVENTOR.
DALTON L. SHINN
BY
Buckhorn, Cheatham & Blore
ATTORNEYS

United States Patent Office 2,951,416
Patented Sept. 6, 1960

2,951,416

DEVICE FOR MEASURING FILM THICKNESS

Dalton L. Shinn, Camas, Wash., assignor to Crown Zellerbach Corporation, San Francisco, Calif., a corporation of Nevada Filed Oct. 16, 1956, Ser. No. 616,201

10 Claims. (Cl. 88—14)

The present invention relates to a method and means for measuring film thickness, and more particularly for measuring the thickness of a liquid film upon the surface of an object.

Many industrial processes involve the continuous transfer of a film of liquid from a reservoir of the liquid onto a surface by first feeding the liquid from the reservoir onto a roll and thereafter rolling the roll across the surface to be coated. A familiar example of such a commercial process is the printing of continuously moving webs of paper. Another example is in the paper making art wherein continuously moving webs of paper are coated with various materials such as, for example, aqueous mixtures of clay and starch.

In certain types of printing processes, ink is applied from a reservoir to an ink transfer roll so as to form on such roll a substantially uniform coating of the ink. The ink transfer roll rolls in contact with the press rolls carrying a design or character to be printed. The ink is transferred from the transfer roll to the press roll and thence either directly or through an offset roll to the paper or other medium being printed. The amount of ink applied to the paper is dependent upon the thickness of the ink film on the press roll, the thickness of such film being in turn dependent upon the thickness of the ink film upon the ink transfer roll. Thus, the printing quality may be controlled by controlling the amount of ink fed from the reservoir onto the ink transfer roll. Heretofore, control of the rate of feed of ink from the reservoir has been based upon visual examination of the printed sheet. Where the printing is carried out at high speed, it is difficult to examine the quality of the printing while the press is running and, moreover, such control is, in any event, subject to the judgment of the operator of the press, and is thus subject to human whims and errors. To be on the safe side, the operators quite generally use an excessive amount of ink since this ordinarily does not impair the quality of printing as does the use of an inadequate amount. Similar difficulties have been met in controlling the application of films of liquid in other industrial processes.

It is, therefore, a principal object of the present invention to provide a new and improved method and means for measuring the thickness of liquid films.

More particularly, it is an object of the invention to provide a new and improved method and means for continually monitoring and indicating the thickness of a liquid film upon a surface.

A specific object of the invention is to provide a new and improved method and means for measuring the thickness of a liquid film on a revolvable cylindrical element.

Another object is to provide a method and means for accurately controlling the amount of ink used in printing operations, particularly to avoid the use of excessive amounts of ink.

Other objects and advantages of the invention will become more apparent in the following detailed description of an embodiment of the invention taken in conjunction with the accompanying drawings wherein.

In accordance with the method of the invention, the thickness of the layer or film of a light absorbing liquid upon a surface is measured by contacting such surface with an element of light transmitting material which is wettable by the liquid so that a portion of the liquid will be transferred to the surface of such element, and thereafter measuring the light transmissibility through the element and liquid film thereon. Since the amount of liquid transferred to the transparent element will vary with the thickness of the film of liquid to be measured, by measuring the light transmissibility through the element and the film of liquid transferred thereto, the thickness of the film on the original surface may be determined.

The invention is particularly illustrated in connection with apparatus for measuring the thickness of a film of liquid upon a roll 10, such as the ink transfer roll of a printing press or the coating transfer roll in a paper coating machine. As will be understood by those skilled in the art, the ink or liquid to be transferred is fed evenly by suitable means onto the surface of such a roll which then transfers the liquid onto a press or coating roll (not shown) which in turn rolls in contact with the material being printed or coated, or with an offset roll which in turn contacts the material being printed or coated. The amount of liquid which is ultimately transferred to the press or coating roll is dependent upon the thickness of the liquid film upon the roll 10 and it is important, therefore, that the amount of liquid fed to the roll 10 be accurately controlled so as to obtain the desired thickness of the liquid film thereon.

The roll 10 is illustrated as being supported in a frame including standards 12 and a cross member 14. In accordance with the illustrated embodiment of the invention, a hollow, transparent film pick-up roll 16 is mounted adjacent the roll 10 so as to roll in peripheral engagement therewith whereby liquid on the roll 10 will partition and a portion will transfer from the roll 10 onto the roll 16. It has been found that the thickness of the liquid film on the roll 16 varies as a function of the thickness of the film upon the roll 10. Thus, by measuring the thickness of the film upon the roll 16, the thickness of the film upon the roll 10 may be determined.

Figure 4:
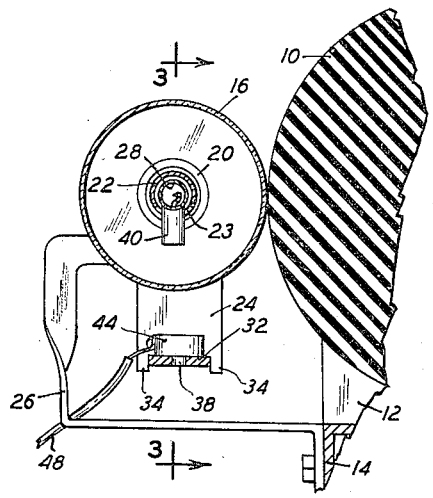
Fig. 4 is a sectional view taken substantially along line 4—4 of Fig. 3.

In the illustrated embodiment of the invention, the roll 16 is rotatably supported by bearings 20 mounted adjacent the opposite ends of a sleeve 22 which is cut away intermediate its ends to provide a slot 23 extending substantially the length of the interior of the roll 16. The opposite end portions of the sleeve 22 are secured to mounting members 24 held in fixed position relative to the roll 16 by suitable means such as brackets 26. Extending through and slidable longitudinally of the sleeve 22 is an elongate hollow shaft 28 to the opposite ends of which are suitably secured the end pieces 30 of a U-shaped frame having a member 32 extending between the end pieces 30. As best seen in Fig. 4, the member 32 slides between and is guided by ears 34 provided on the mounting members 24. A lock screw 36 is provided to lock the frame 30, 32 in position relative to the roll 10, the screw being threaded into one of the mounting members 24 and extending through a slot 38 formed in the member 32.

Figure 1:
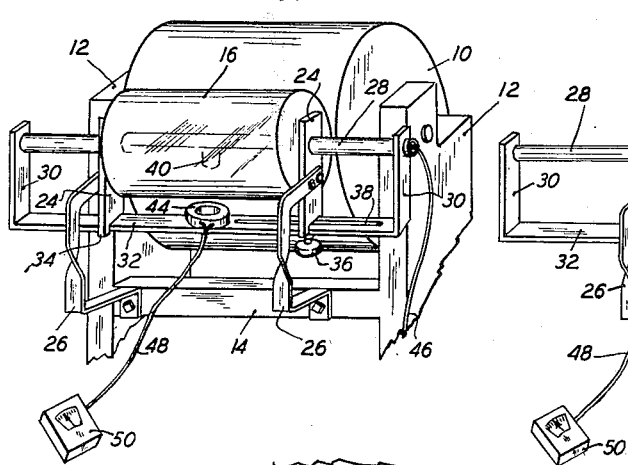
Fig. 1 is a somewhat schematic perspective view of apparatus constructed in accordance with the invention.
Figure 2:
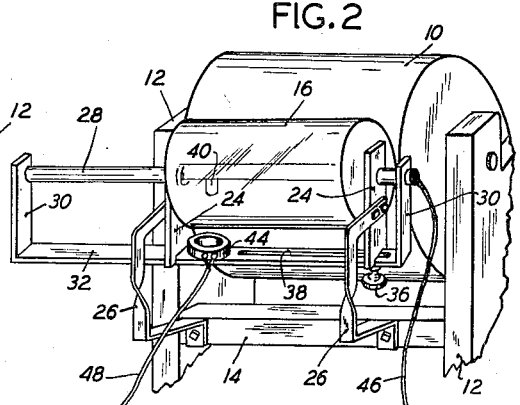
Fig. 2 is a view similar to Fig. 1 showing the apparatus in a different position of use.
Figure 3:
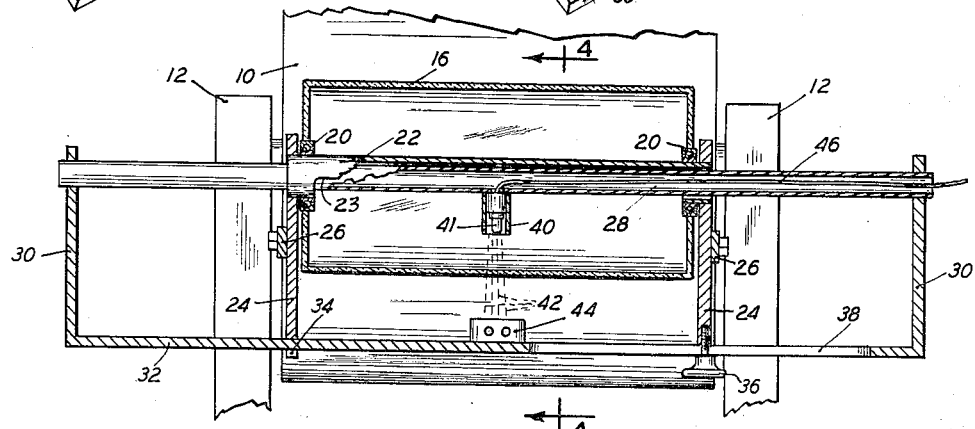
Fig. 3 is a sectional view of a portion of the apparatus taken substantially along line 3—3 of Fig. 4.

Photometric means are provided for measuring the light transmissibility of the liquid film upon the roll 16. In accordance with the illustrated embodiment of the present invention, the thickness of the liquid film or layer upon the roll 16 is measured by measuring the total light transmitted through the wall of the roll and of the liquid film thereon, utilizing a light source and a photoelectric cell, one mounted inside and one outside of the roll. As shown in the drawings, a light source 40 is mounted on the shaft 28 to protrude through the slot 23 in the sleeve 22 and an electric lamp 41 therein is positioned to cast a beam indicated at 42 through the wall of the roll and towards a photo sensitive device such as a photoelectric cell 44 mounted on frame member 32. The light source 40 is connected to a suitable power source by leads 46 which extend through the hollow shaft 28. The photoelectric cell 44 may be connected by leads 48 to a meter such as indicated at 50, or the output of the photoelectric cell may be applied to the input terminals of a recorder or to a controller unit to control feeding of liquid to the roll 10. In either case, the amount of liquid upon the roll 10 is continually monitored and any variations in the amount can be immediately noted or can be immediately and automatically corrected if the photoelectric cell is connected directly to a controller unit. As will be evident with reference to Fig. 2, by shifting the frame 30, 32 and shaft 28 longitudinally of the roll, the light source 40 and photoelectric cell 44 may be moved longitudinally of the roll 16 to permit scanning of the roll along its length.

The roll 16 is shown as rolling freely in contact with the roll 10 so as to be driven by reason of the frictional engagement between the rolls. However, in certain instances it may be desirable to drive the roll 16 by separate power means.

It will be obvious that to permit utilization of the invention shown herein, the liquid being applied to the roll 10 must possess a certain degree of light absorbency so that the amount of light transmitted through the roll 16 will vary as the thickness of the liquid film thereon varies.

The roll 16 may be formed of any suitable material such as glass or the material sold under the trademark of Lucite, or other material through which light may be transmitted. Where the term "transparent" is used in this specification and in the appended claims, it is to be understood to describe generally materials through which light may be transmitted to a degree sufficient for the purposes of the invention and to include strictly transparent and "translucent" materials as well. Suitable materials will be obvious to those skilled in the art.

Having illustrated and described a preferred embodiment of the invention, it should be apparent to those skilled in the art that the invention permits of modification in arrangement and detail. I claim as my invention all such modifications as come within the true spirit and scope of the appended claims.

I claim:

1. Apparatus for meauring the thickness of a light absorbing liquid film on a moving member, comprising a film pick-up roll of light transmitting material, mounting means operatively arranged with said film pick-up roll for mounting said film pick-up roll in peripheral engagement with said member so as to roll upon the surface of said member so that liquid will transfer between said member and said roll proportionate to the amount on each, a light source for projecting light through the wall of said roll, and photometric means in the path of said projected light for measuring the light transmissibility through said film pick-up roll.

2. Apparatus for indicating the thickness of a light absorbing liquid film on a liquid transfer roll, comprising a transparent hollow roll, mounting means operatively arranged with said hollow roll for rotatably mounting the same in peripheral engagement with a liquid transfer roll so that liquid will transfer between said rolls proportionate to the amount on each, a light source for projecting light through the wall of said roll, and photometric means in the path of said projected light for measuring the light transmissibility through the wall of said hollow roll and said film of liquid thereon.

3. Apparatus for indicating the thickness of a light absorbing liquid film on a liquid transfer roll, comprising a transparent hollow roll of light transmitting material, mounting means operatively arranged with said hollow roll for rotatably mounting the same in peripheral engagement with a liquid transfer roll so that liquid will transfer between said rolls proportionate to the amount on each, a source of light mounted within said hollow roll, and a means mounted exteriorly of said hollow roll for measuring the light transmitted through said roll.

4. Apparatus for measuring the thickness of a light absorbing liquid film on a liquid transfer roll comprising an elongate shaft, a hollow roll of light transmitting material mounted on said shaft for rotation about the shaft and for movement longitudinally of the shaft, mounting means operatively arranged with said hollow roll for mounting said hollow roll in peripheral engagement with a liquid transfer roll so that liquid will transfer between said rolls proportionate to the amount on each, a source of light mounted on said shaft within said hollow roll, and a photo sensitive device mounted exteriorly of said hollow roll for receiving light from said source transmitted through said hollow roll.

5. Apparatus for measuring the thickness of a light absorbing liquid film on a rotatable drumlike element, comprising a hollow roll of light transmitting material adapted to be mounted in peripheral engagement with said drumlike element and to rotate in contact therewith so that liquid will transfer between said element and said roll proportionate to the amount on each, means for measuring the light transmissibility through said roll including a light source arranged to project a beam of light through the wall of said roll and a photo sensitive device to receive the light transmitted therethrough, and means mounting said light source and said photo sensitive device for movement longitudinally of said roll to permit scanning of the liquid film thereon.

6. Apparatus for measuring the thickness of a light absorbing liquid film on a rotatable drumlike element, comprising a roll of light transmitting material adapted to be mounted in peripheral engagement with said drumlike element and to rotate in contact therewith so that liquid will transfer between said element and said roll proportionate to the amount on each, means for measuring the light transmissibility through said roll including a light source arranged to project a beam of light through said roll and a photo sensitive device to receive the light transmitted therethrough, and means mounting said light source and said photo sensitive device for movement longitudinally of said roll to permit scanning of the liquid film thereon.

7. In combination, a drumlike element adapted to carry on the periphery thereof a film of light absorbing liquid and means for measuring the relative thickness of said film comprising a roll of light transmitting material mounted to roll in peripheral engagement with said element whereby liquid will transfer between said element and said roll proportionate to the amount on each, means for projecting light through said roll, and photometric means operatively arranged with said roll for measuring the light transmitted therethrough.

8. In combination, a drumlike element adapted to carry on the periphery thereof a film of light absorbing liquid and means for measuring the relative thickness of said layer comprising a roll of light transmitting material mounted to roll in peripheral engagement with said element so that liquid will transfer between said element and said roll proportionate to the amount on each, and photometric means operatively arranged with said roll for measuring the light transmissibility therethrough, said photometric means comprising a source of light arranged to project a beam of light through said roll and a photo sensitive device to measure the intensity of the light transmitted through said roll and the liquid film thereon, and means mounting said roll and said photometric means for relative movement longitudinally of said roll to permit scanning of the liquid film thickness throughout the length of said roll.

9. Apparatus for measuring the thickness of a light absorbing film on the surface of a moving member, comprising a film pick-up element of light transmitting material, mounting means operatively arranged with said film pick-up element for mounting said film pick-up element to bring said element into engagement with said member surface so that liquid will transfer between said element and said member proportionate to the amount on each, a light source for projecting light through said element, and photometric means in the path of said projected light for measuring the light transmissibility through said film pick-up element and liquid thereon.

10. The method of measuring the thickness of a film of light absorbing liquid upon a cylindrical rotating element which comprises engaging said element with a light transmissible member moving at substantially the same speed as the periphery of said element to transfer to said member a portion of the liquid film upon the element and form on said member a liquid film which is proportionate in thickness to the thickness of the liquid film upon said element, and measuring the light transmissibility of the film upon said member.

References Cited in the file of this patent

UNITED STATES PATENTS

| | | |
|---|---|---|
| 939,339 | Sellers | Nov. 9, 1909 |
| 2,239,452 | Williams et al. | Apr. 22, 1941 |
| 2,398,435 | Marks | Apr. 16, 1946 |
| 2,398,904 | Libman et al. | Apr. 23, 1946 |
| 2,517,330 | Marenholtz | Aug. 1, 1950 |
| 2,520,768 | Kunicki | Aug. 29, 1950 |
| 2,562,901 | Fischer | Aug. 7, 1951 |